United States Patent
Goto et al.

(10) Patent No.: US 9,676,052 B2
(45) Date of Patent: Jun. 13, 2017

(54) RESISTANCE WELDING METHOD

(75) Inventors: Akira Goto, Utsunomiya (JP); Yushi Aoki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 13/375,579

(22) PCT Filed: Jun. 2, 2010

(86) PCT No.: PCT/JP2010/059312
§ 371 (c)(1),
(2), (4) Date: Dec. 1, 2011

(87) PCT Pub. No.: WO2010/140605
PCT Pub. Date: Dec. 9, 2010

(65) Prior Publication Data
US 2012/0074104 A1    Mar. 29, 2012

(30) Foreign Application Priority Data

Jun. 5, 2009 (JP) .................................. 2009-136010
Apr. 26, 2010 (JP) .................................. 2010-100860

(51) Int. Cl.
B23K 11/00     (2006.01)
B23K 11/31     (2006.01)
(Continued)

(52) U.S. Cl.
CPC ........... B23K 11/315 (2013.01); B23K 11/115 (2013.01); B23K 11/36 (2013.01)

(58) Field of Classification Search
CPC ..... B23K 11/115; B23K 11/315; B23K 11/36; B23K 11/00; B23K 11/11
(Continued)

(56) References Cited

U.S. PATENT DOCUMENTS 7,473,865 B2 * 1/2009 Stieglbauer et al. ......... 219/119
7,511,244 B2   3/2009 Stieglbauer et al.
(Continued)

FOREIGN PATENT DOCUMENTS

CN    1665636       9/2005
JP    09094670 A  * 4/1997  ............. B23K 11/11
(Continued)

OTHER PUBLICATIONS

Machine Translation of JP 09094670 (Totsuka et al.) including English language Abstract.*
(Continued)

*Primary Examiner* — David Angwin
*Assistant Examiner* — Amit K Singh
(74) *Attorney, Agent, or Firm* — Rankin, Hill & Clark LLP

(57) ABSTRACT

A resistance welding method for welding a stack of three or more workpieces. The method includes the steps of holding a first welding tip in abutment against a first outermost workpiece, holding a second welding tip in abutment against a second outermost workpiece, and holding a pressing member in abutment against the first outermost workpiece. The method also includes the steps of gripping the stacked assembly with the first welding tip, the second welding tip, and the pressing member and passing an electric current between the first welding electrode and the second welding electrode.

2 Claims, 15 Drawing Sheets

(51) Int. Cl.
*B23K 11/11* (2006.01)
*B23K 11/36* (2006.01)

(58) Field of Classification Search
USPC .......................................... 29/33 B
See application file for complete search history.

(56) References Cited

U.S. PATENT DOCUMENTS

| | | | |
|---|---|---|---|
| 7,518,083 B2 | 4/2009 | Stieglbauer et al. | |
| 2008/0041828 A1* | 2/2008 | Lang et al. | 219/119 |

FOREIGN PATENT DOCUMENTS

| | | |
|---|---|---|
| JP | 2003-251469 | 9/2003 |
| JP | 3894545 | 12/2006 |
| JP | 2008-023554 | 2/2008 |

OTHER PUBLICATIONS

Chinese Office Action, Application No. 201080024780.3 with English translation, dated Sep. 30, 2013, 12 pages.
Office action dated Jun. 17, 2015 filed in Chinese Patent Application No. 201080024780.3.

* cited by examiner

RESISTANCE WELDING METHOD

TECHNICAL FIELD

The present invention relates to a resistance welding method and a resistance welding apparatus (device) for resistance-welding a stacked assembly of three or more workpieces including a thinnest workpiece, which is disposed on an outermost side of the stacked assembly.

BACKGROUND ART

One known process of joining a plurality of metal sheets together is a resistance welding process in which the metal sheets are stacked in a stacked assembly. Then, after the stacked assembly is gripped and pressed by a set of welding electrodes, an electric current is passed between the welding electrodes to melt a region of the metal sheets near contact surfaces thereof. When solidified, the melted region is turned into a solid phase, which is referred to as a nugget. In certain cases, three or more metal sheets are joined together by the resistance welding process.

Thicknesses of metal sheets or workpieces to be resistance-welded may not necessarily be identical to each other, but differ from each other in most cases. Therefore, the metal sheets tend to include a workpiece, the thickness of which is the smallest (hereinafter also referred to as a "thinnest workpiece").

If the stacked assembly of metal sheets, including the thinnest workpiece disposed on an outermost side of the stacked assembly, is resistance-welded while pressing forces, which are applied to the stacked assembly by a pair of respective welding electrodes, are held in substantial equilibrium with each other, then the nugget that is formed between the thinnest workpiece and the workpiece adjacent thereto may not grow sufficiently. The reason for insufficient growth of the nugget is considered to be based on the fact that, if the stacked assembly comprises three stacked workpieces, then since the contact resistance between the thinnest workpiece and the adjacent workpiece is reduced due to ends of the thinnest workpiece flexing away from the adjacent workpiece, a sufficient amount of Joule heat is not generated between the thinnest workpiece and the adjacent workpiece, as disclosed in Japanese Patent No. 3894545.

The electric current, which is passed between the welding electrodes, may be increased in order to cause the nugget near the thinnest workpiece to grow sufficiently, thereby increasing the amount of Joule heat generated by the thinnest workpiece. However, such an increased amount of electric current tends to flow into the thicker workpieces, unduly melting the workpieces and producing scattered metal particles, thereby resulting in sputtering.

It may be considered effective to increase the energization time over which electric current is passed between the welding electrodes. However, it is not easy for the thinnest workpiece to be made to generate a sufficient amount of Joule heat, even with an increased energization time. The increased energization time also leads to a reduction in welding efficiency because the welding time is increased.

The present applicant has proposed in Japanese Patent No. 3894545 that the pressing force applied by the welding electrode, which is pressed against the thinnest workpiece, should be made smaller than the pressing force applied by the other welding electrode. By adjusting the pressing forces applied by the welding electrodes to the stacked assembly in this manner, it is possible to bring the amount of Joule heat generated at the interface between the workpieces into substantial equilibrium. Consequently, it is possible to allow the nugget between the thinnest workpiece and the adjacent workpiece to grow to a size which is substantially the same as the size of the nugget between the adjacent workpiece and the other workpiece.

SUMMARY OF INVENTION

A general object of the present invention is to provide a resistance welding method, which is capable of further growing a nugget between a thinnest workpiece on an outermost side of a stacked assembly and a workpiece disposed adjacent to the thinnest workpiece.

A principal object of the present invention is to provide a resistance welding method, which avoids the tendency to cause sputtering.

Another object of the present invention is to provide a resistance welding apparatus, which is capable of further growing a nugget, as described above.

Still another object of the present invention is to provide a resistance welding apparatus, which avoids the tendency to cause sputtering.

According to an aspect of the present invention, there is provided a resistance welding method for resistance-welding a stacked assembly of at least three workpieces, including a thinnest workpiece of smallest thickness disposed on an outermost side of the stacked assembly, comprising the steps of:

gripping the stacked assembly with a first welding electrode and a second welding electrode, holding a pressing member in abutment against an area of the thinnest workpiece, which differs from an area against which the first welding electrode is held in abutment, and causing the pressing member to press the stacked assembly from the side of the thinnest workpiece; and passing an electric current between the first welding electrode and the second welding electrode, while pressing forces applied from the first welding electrode and the pressing member to the stacked assembly and a pressing force applied from the second welding electrode to the stacked assembly are held in equilibrium with each other.

Since the sum of the pressing forces applied from the first welding electrode and the pressing member to the stacked assembly is held in equilibrium with the pressing force applied from the second welding electrode to the stacked assembly, the pressing force applied from the first welding electrode is smaller than the pressing force applied from the second welding electrode. Therefore, between the first welding electrode and the second welding electrode, which substantially faces toward the first welding electrode, the active range of the pressing forces grows progressively wider from the first welding electrode toward the second welding electrode. Therefore, a force acting on the interface between the thinnest workpiece and the workpiece adjacent thereto is smaller than the force acting on the interface between the remaining workpieces.

Because of the above distribution of pressing forces, the area of the thinnest workpiece, which contacts the workpiece adjacent thereto, is smaller than the area of the remaining workpieces that are in contact with each other. Consequently, the contact resistance at the interface between the thinnest workpiece and the workpiece adjacent thereto is increased, thereby increasing the generated amount of Joule heat. As a result, a joint strength between the thinnest workpiece and the workpiece adjacent thereto is achieved.

In addition, since the thinnest workpiece is pressed by the pressing member, the thinnest workpiece is prevented from becoming spaced from the workpiece adjacent thereto. Therefore, the softened melted region is prevented from being scattered as sputter from a region where the thinnest workpiece and the workpiece adjacent thereto might otherwise be spaced from each other.

The pressing member may comprise an auxiliary electrode, which is opposite in polarity to the first welding electrode, such that when electric current is passed between the first welding electrode and the second welding electrode, either a branched electric current directed from the first welding electrode toward the auxiliary electrode, or a branched electric current directed from the auxiliary electrode toward the first welding electrode is produced.

Since the electric current directed from the first welding electrode toward the auxiliary electrode or the electric current directed in the opposite direction flows through the thinnest workpiece, the electric current sufficiently heats the interface between the thinnest workpiece and the workpiece adjacent thereto. As a consequence, a sufficiently sized nugget is grown at the interface, thereby providing a joined product having an excellent joint strength.

According to another aspect of the present invention, there also is provided a resistance welding apparatus for resistance-welding a stacked assembly of at least three workpieces, including a thinnest workpiece of smallest thickness disposed on an outermost side of the stacked assembly, comprising:

a welding gun including:
a first welding electrode that abuts against the thinnest workpiece;
a second welding electrode that grips the stacked assembly in coaction with the first welding electrode; and
a pressing member, which abuts against an area of the thinnest workpiece that differs from an area against which the first welding electrode is held in abutment, and which presses the stacked assembly from the side of the thinnest workpiece;
a pressing mechanism, which applies pressing forces for pressing the stacked assembly against the pressing member; and
control means for controlling the pressing mechanism,
wherein when an electric current is passed between the first welding electrode and the second welding electrode, the control means holds pressing forces, which are applied from the first welding electrode and the pressing member to the stacked assembly, and a pressing force applied from the second welding electrode to the stacked assembly, in equilibrium with each other.

With the above arrangement, the pressing forces applied from the first welding electrode and the second welding electrode are distributed such that the acting range thereof grows progressively greater from the first welding electrode (thinnest workpiece) toward the second welding electrode. As a result, the contact resistance at the interface between the thinnest workpiece and the workpiece adjacent thereto is increased. Thus, the joint strength of the thinnest workpiece and the workpiece adjacent thereto is increased.

If the welding gun is supported on a robot, then the pressing mechanism should preferably be mounted on the welding gun. Inasmuch as reactive forces from the stacked assembly can be absorbed by the welding gun, reactive forces are prevented from acting on the robot. Therefore, the robot does not need to be significantly rigid. Stated otherwise, the robot may be reduced in size and hence facility investments may be reduced.

The pressing member may comprise an auxiliary electrode, which is opposite in polarity to the first welding electrode, such that when electric current is passed between the first welding electrode and the second welding electrode, either a branched electric current directed from the first welding electrode toward the auxiliary electrode, or a branched electric current directed from the auxiliary electrode toward the first welding electrode is produced. As described above, since the interface between the thinnest workpiece and the workpiece adjacent thereto is sufficiently heated due to the electric current directed from the first welding electrode toward the auxiliary electrode or the electric current flowing in the opposite direction, a sufficiently sized nugget is grown at the interface, thereby providing a joined product having excellent joint strength.

According to the present invention, as described above, the first welding electrode and the second welding electrode grip the stacked assembly therebetween, and the thinnest workpiece, which is disposed on the outermost side of the stacked assembly, is pressed by the pressing member, during which time the stacked assembly is resistance-welded. Therefore, the pressing forces applied to the stacked assembly are distributed such that the acting range thereof grows progressively greater from the first welding electrode toward the second welding electrode.

Since the pressing forces are distributed, the area of contact at the interface between the thinnest workpiece and the workpiece adjacent thereto is reduced, resulting in an increase in contact resistance at the interface. Therefore, a sufficient amount of Joule heat, which is capable of heating the interface, is generated, thereby allowing a nugget of sufficient size to be grown at the interface. The thinnest workpiece and the workpiece adjacent thereto are thus joined to each other with a sufficient joint strength.

Stated otherwise, a sufficient joint strength is maintained between the thinnest workpiece and the workpiece adjacent thereto.

DESCRIPTION OF EMBODIMENTS

Resistance welding methods according to embodiments of the present invention will be described in detail below with reference to the accompanying drawings, in connection with resistance welding apparatus that carry out the resistance welding methods.

Figure 1:
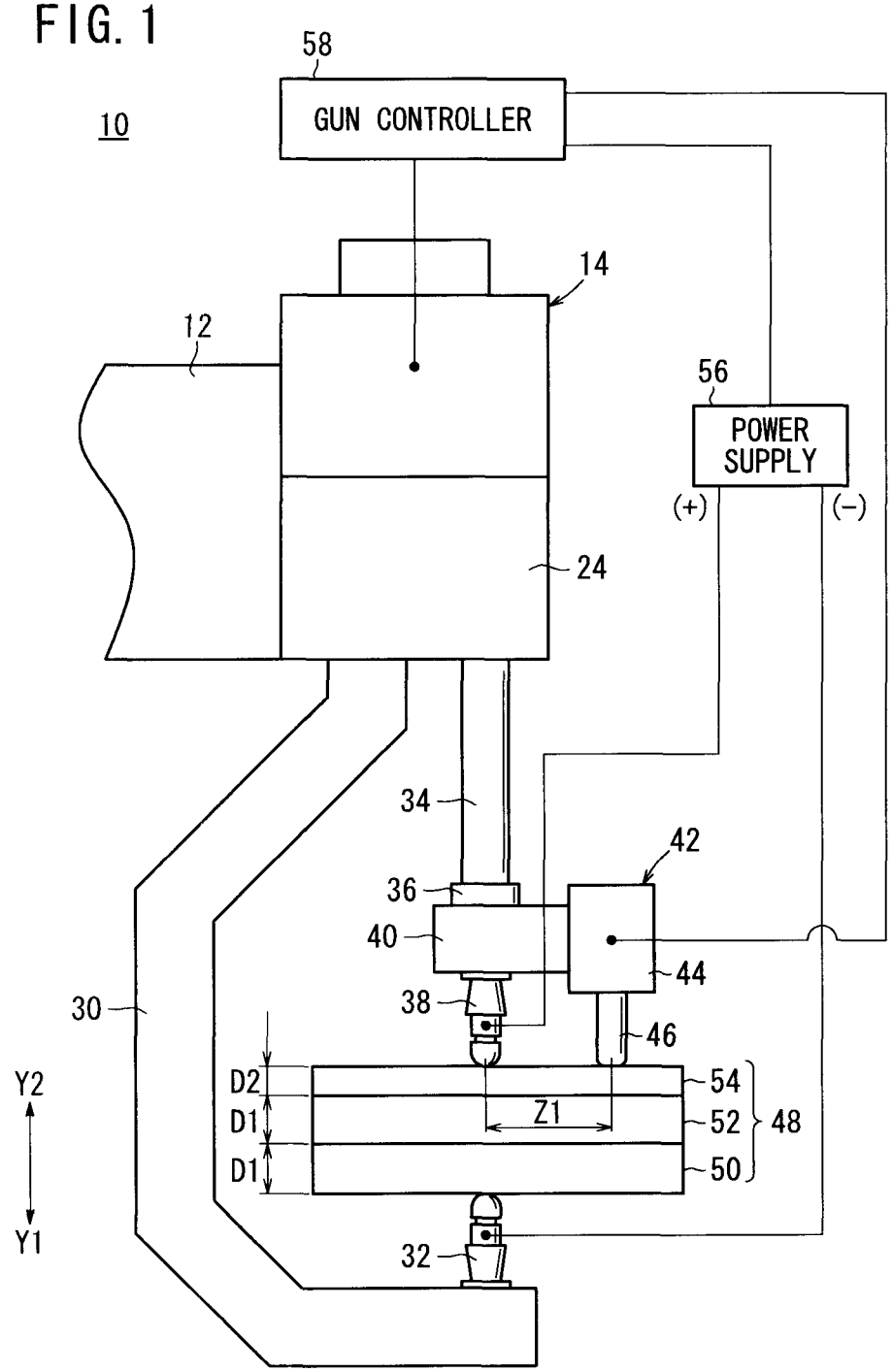
FIG. 1 is an enlarged view of a central portion of a resistance welding apparatus according to a first embodiment of the present invention.

FIG. 1 is an enlarged view of a central portion of a resistance welding apparatus 10 according to a first embodiment of the present invention. The resistance welding apparatus 10 comprises a robot having an arm (both not shown) and a welding gun 14 supported on a wrist 12 of the arm.

The welding gun 14 is a so-called C-type welding gun, including a substantially C-shaped fixed arm 30 disposed below a main gun body 24. A lower tip 32 that serves as a second welding electrode is mounted on the lower tip end of the fixed arm 30 in facing relation to the main gun body 24. The lower tip 32 extends toward the main gun body 24.

The main gun body 24 houses a ball screw mechanism (not shown). The ball screw mechanism includes a ball screw, which serves to vertically displace a connecting rod 34 (in the direction indicated by the arrow Y2 or the arrow Y1 in FIG. 1). The connecting rod 34 projects from the main gun body 24 and extends toward the lower tip 32. The balls screw is rotated about its axis by a servomotor (not shown) of the ball screw mechanism.

An upper tip 38 that serves as a first welding electrode is mounted by a stay 36 on the tip end of the connecting rod 34 in facing relation to the lower tip 32. A cylinder mechanism 42 that serves as a pressing mechanism is supported on the stay 36 by a bridge 40. The cylinder mechanism 42 has a cylinder tube 44 from which there projects a pressing rod 46 serving as a pressing member parallel to the upper tip 38. According to the first embodiment, both the pressing mechanism (cylinder mechanism 42) and the pressing member (pressing rod 46) are mounted on the welding gun 14.

A stacked assembly 48 to be welded will be described below. The stacked assembly 48 comprises three metal sheets 50, 52, 54, which are stacked successively from below in this order. The metal sheets 50 and 52 have a thickness D1 (e.g., in the range from about 1 mm to about 2 mm), and the metal sheet 54 has a thickness D2 (e.g., in the range from about 0.5 mm to about 0.7 mm), which is smaller than the thickness D1. In other words, the metal sheets 50 and 52 are identical in thickness to each other, and the metal sheet 54 is thinner than the metal sheets 50 and 52. The metal sheet 54 is the thinnest of the workpieces 50, 52, 54.

The metal sheets 50 and 52 are made of so-called high-tension steel according to JAC590, JAC780, or JAC980 (high-performance high-tensile-strength sheet steel specified by the Japan Iron and Steel Federation Standards), for example, and the metal sheet 54 is made of so-called mild steel according to JAC270 (high-performance sheet steel for drawing specified by the Japan Iron and Steel Federation Standards). The metal sheets 50 and 52 may be of one metal type or may be of different metal types.

Alternatively, all of the metal sheets 50, 52, 54 may be made of mild steel, or only the metal sheet 50 may be made of high-tension steel while the metal sheets 52 and 54 may be made of mild steel.

The metal sheets 50, 52, 54 are not limited to the above steel materials, but may be of any materials insofar as the metal sheets can be resistance-welded.

The lower tip 32 and the upper tip 38 grip the stacked assembly 48 therebetween and pass an electric current through the stacked assembly 48. The lower tip 32 is connected electrically to the negative pole of a power supply 56, and the upper tip 38 is electrically connected to the positive pole of the power supply 56. According to the first embodiment, therefore, an electric current flows from the upper tip 38 toward the lower tip 32.

As described later, the upper tip 38 and the pressing rod 46 are spaced from each other by a distance Z1, which is set to a value for providing an appropriate surface pressure distribution between the thinnest workpiece 54 and the metal sheet 52 directly below the thinnest workpiece 54.

The servomotor of the ball screw mechanism, the cylinder mechanism 42, and the power supply 56 are electrically connected to a gun controller 58, which serves as a control means. Therefore, the servomotor, the cylinder mechanism 42, and the power supply 56 are operated or energized and de-energized under the control of the gun controller 58.

The resistance welding apparatus 10 according to the first embodiment is basically constructed as described above. Operations and advantages of the resistance welding apparatus 10 will be described below in relation to a resistance welding method according to the first embodiment.

For resistance-welding the stacked assembly 48, or stated otherwise, for joining the metal sheets 50 and 52 to each other and joining the metal sheets 52 and 54 to each other, the robot moves the wrist 12, i.e., the welding gun 14, in order to position the stacked assembly 48 between the lower tip 32 and the upper tip 38.

After the main gun body 24 has been moved to a predetermined position, the gun controller 58 is operated to energize the servomotor of the ball screw mechanism, which starts to rotate the ball screw. The upper tip 38 and the pressing rod 46 are lowered toward the stacked assembly 48 along the direction indicated by the arrow Y1. As a result, the stacked assembly 48 is gripped between the lower tip 32 and the upper tip 38.

Figure 2:
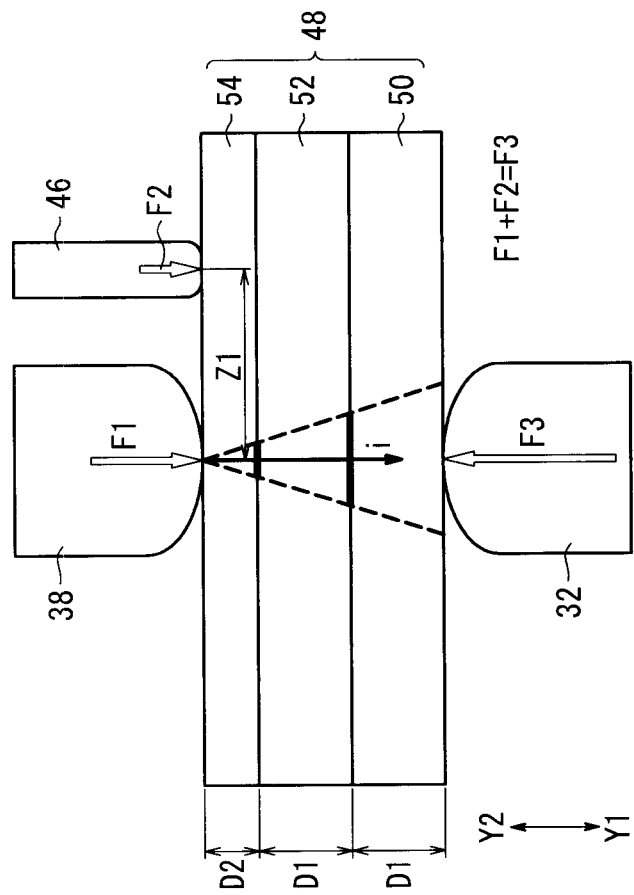
FIG. 2 is a vertical cross-sectional view showing the manner in which a stacked assembly to be welded is sandwiched by a lower tip, an upper tip, and a pressing rod (pressing member)

The gun controller 58 also actuates the cylinder mechanism 42. The pressing rod 46 further projects along the direction indicated by the arrow Y1. At the same time or almost at the same time that the stacked assembly 48 is gripped between the lower tip 32 and the upper tip 38, or before or after the stacked assembly 48 has been gripped between the lower tip 32 and the upper tip 38, the pressing rod 46 abuts against the metal sheet 54. FIG. 2 shows in vertical cross section the lower tip 32, the upper tip 38, the pressing rod 46, and the stacked assembly 48 at this time.

Figure 3:
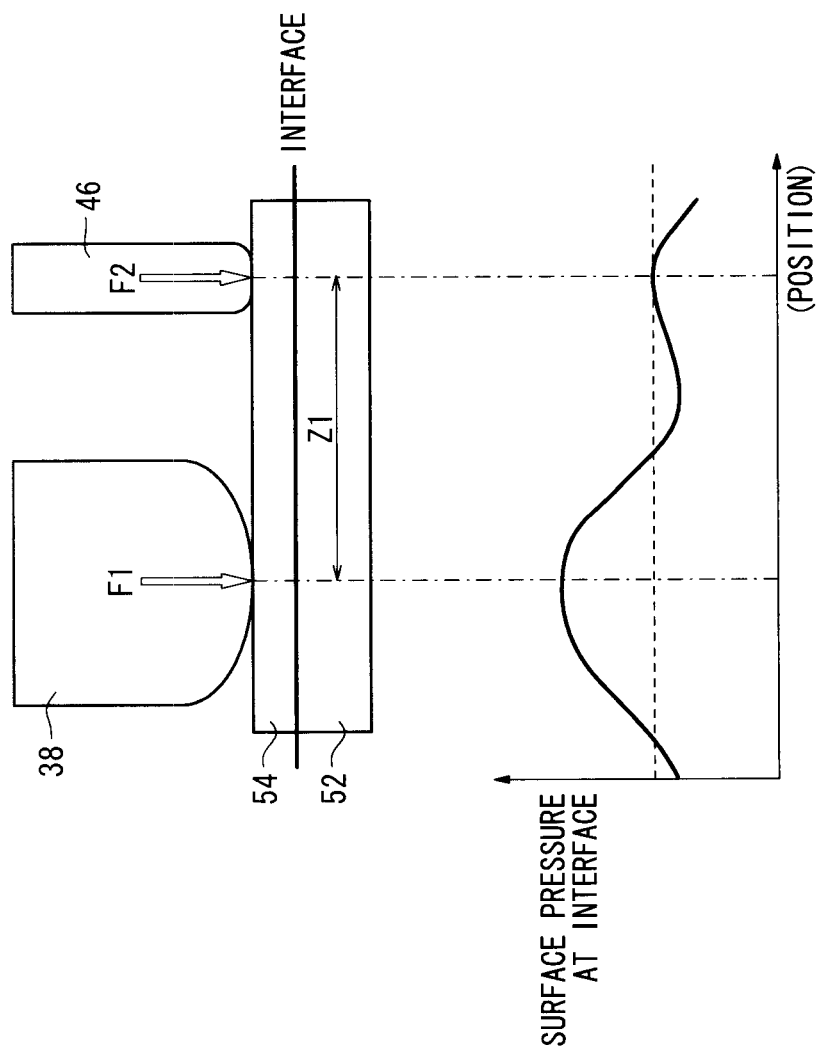
FIG. 3 is a front elevational view showing the manner in which an appropriate surface pressure distribution is developed between a workpiece positioned on an uppermost side of the stacked assembly and a workpiece positioned directly therebelow.

As shown in FIG. 3, the distance Z1 between the upper tip 38 and the pressing rod 46 is set to a value such that the surface pressure, which acts on the interface between the thinnest workpiece 54 and the metal sheet 52, is greatest in an area where the stacked assembly 48 is pressed by the upper tip 38, and is second greatest in an area where the stacked assembly 48 is pressed by the pressing rod 46. Stated otherwise, the interface includes an area where the surface pressure is lower than the surface pressure applied by the upper tip 38 and the surface pressure applied by the pressing rod 46. As a result, a distribution of pressing forces as shown in FIG. 2 is developed.

The distribution of pressing forces will be described in detail below.

The gun controller 58 controls the rotational force of the servomotor, which rotates the ball screw of the ball screw mechanism, and the thrusting force of the cylinder mechanism 42, such that the sum (F1+F2) of the pressing force F1, which is applied from the upper tip 38 to the metal sheet 54, and the pressing force F2, which is applied from the pressing rod 46 to the metal sheet 54, is held in equilibrium with the pressing force F3, which is applied from the lower tip 32 to the metal sheet 50. Therefore, the pressing force (F1+F2) that acts on the stacked assembly 48 along the direction indicated by the arrow Y1 and the pressing force (F3) that acts on the stacked assembly 48 along the direction indicated by the arrow Y2 are substantially equal to each other.

At this time, F1<F3. Consequently, the forces that the stacked assembly 48 receive from the lower tip 32 and the upper tip 38 are distributed such that the acting range of the forces grows progressively wider or greater in a direction from the upper tip 38 toward the lower tip 32, as shown in FIG. 2. Therefore, the force acting on the interface between the metal sheets 52 and 54 is smaller than the force acting on the interface between the metal sheets 50 and 52. The above distribution of pressing forces will not be developed if an area is not formed where the surface pressure is lower than the surface pressure applied by the upper tip 38 and the surface pressure applied by the pressing rod 46, because the distance Z1 is too small.

Figure 4:
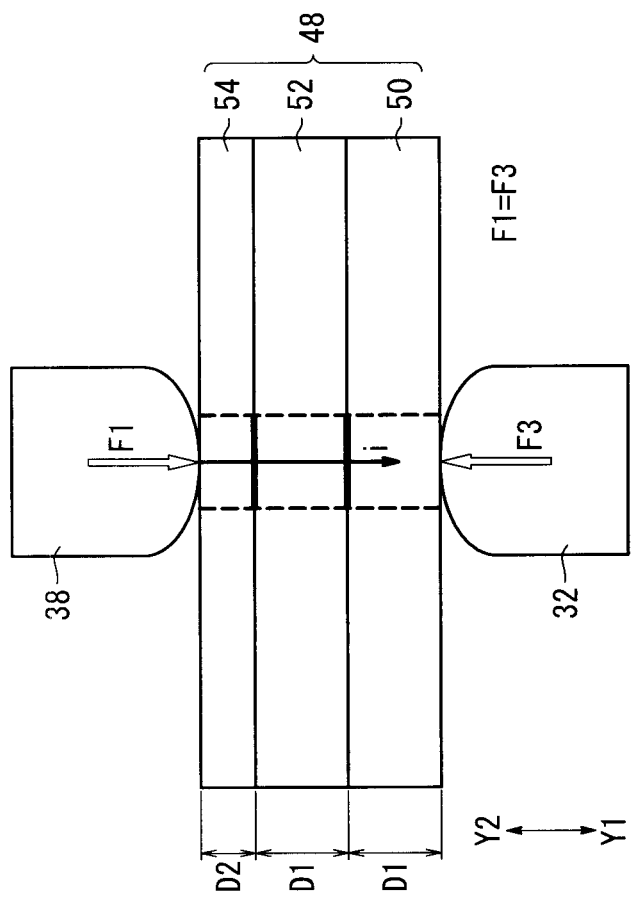
FIG. 4 is a vertical cross-sectional view showing the manner in which the stacked assembly is sandwiched by only the lower tip and the upper tip.

FIG. 4 shows a distribution of forces that the stacked assembly 48 receive from the lower tip 32 and the upper tip 38 if the pressing rod 46 is not used and F1=F3. As shown in FIG. 4, the forces that the stacked assembly 48 receive from the lower tip 32 and the upper tip 38 remain constant along the direction from the upper tip 38 toward the lower tip 32. Stated otherwise, the force acting on the interface between the metal sheets 52 and 54 is equal to the force acting on the interface between the metal sheets 50 and 52.

In FIGS. 2 and 4, the acting range of the force on the interface between the metal sheets 52 and 54 is indicated by the thick solid line. As can be seen from FIGS. 2 and 4, the acting range of the force on the interface between the metal sheets 52 and 54 is smaller when F1<F3 than when F1=F3. This means that the area of the metal sheet 54 that is pressed against the metal sheet 52 is smaller when F1<F3 than when F1=F3, or stated otherwise, the area of the metal sheet 54 that contacts the metal sheet 52 is smaller when F1<F3 than when F1=F3.

Since the pressing forces from the upper tip 38 toward the lower tip 32 are distributed so as to reduce the area of the metal sheet 54 that is in contact with the metal sheet 52, the stacked assembly 48 develops a reactive force, which is directed from the stacked assembly 48 toward the upper tip 38. According to the first embodiment, the reactive force is borne by the pressing rod 46.

As described above, the cylinder mechanism 42 including the pressing rod 46 is supported by the bridge 40 on the connecting rod 34, which is coupled to the ball screw mechanism housed in the main gun body 24. Therefore, the reactive force borne by the pressing rod 46 is absorbed by the main gun body 24 (welding gun 14).

The reactive force from the stacked assembly 48 is thereby prevented from acting on the robot. Accordingly, the robot does not need to have a large rigidity. Stated otherwise, the robot may be of a reduced size and thus facility investments can be reduced.

Then, the gun controller 58 sends a control signal to the power supply 56 for initiating supply of electric current. As shown in FIGS. 2 and 4, an electric current i starts to flow along the direction from the upper tip 38 toward the lower tip 32, because the upper tip 38 and the lower tip 32 are connected respectively to positive and negative poles of the power supply 56, as described above. Based on the electric current i, the interface between the metal sheets 50 and 52 and the interface between the metal sheets 52 and 54 are heated by Joule heat.

Figure 5:
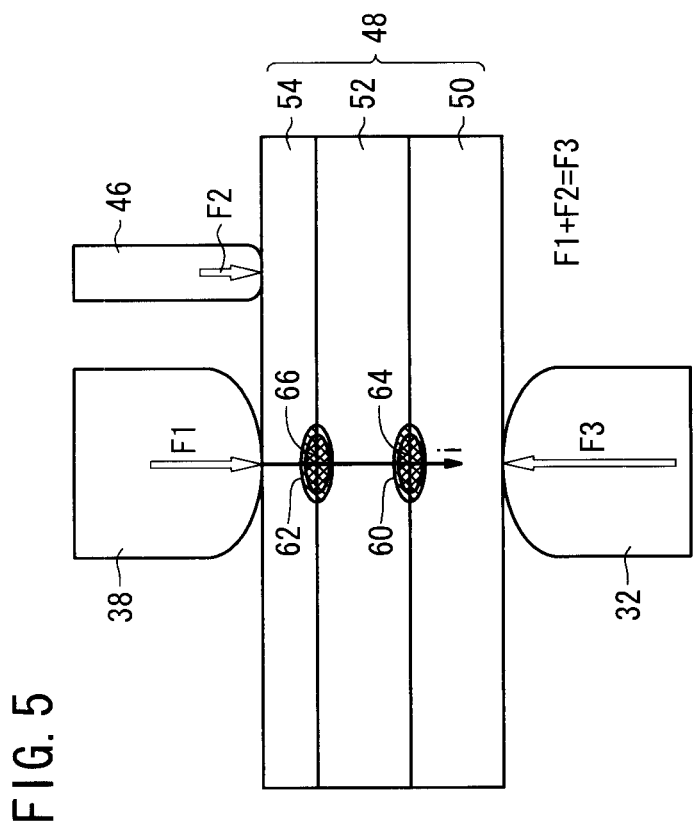
FIG. 5 is a vertical cross-sectional view showing the manner in which the resistance welding apparatus, from the state shown in FIG. 2, begins to pass an electric current, which flows from the upper tip toward the lower tip.

As described above, the area of the metal sheet 54 that contacts the metal sheet 52, as shown in FIG. 2, is smaller than the area of the metal sheet 54 that contacts the metal sheet 52, as shown in FIG. 4. Therefore, the contact resistance and current density at the interface between the metal sheets 52 and 54 is greater in FIG. 2 than in FIG. 4, or stated otherwise, is greater when F1<F3 than when F1=F3. Consequently, the amount of Joule heat, i.e., the amount of generated heat, is greater when F1<F3 than when F1=F3. Therefore, when F1<F3, as shown in FIG. 5, a heated region 60, which is generated at the interface between the metal sheets 50 and 52, and a heated region 62, which is generated at the interface between the metal sheets 52 and 54, grow substantially the same in size.

The interface between the metal sheets 50 and 52 as well as the interface between the metal sheets 52 and 54 are heated by the heated regions 60 and 62, and begin to melt when the temperature thereof rises sufficiently. As a result, nuggets 64, 66 are formed respectively between the metal sheets 50 and 52, and between the metal sheets 52 and 54.

As described above, inasmuch as the heated region 60 formed at the interface between the metal sheets 50 and 52, and the heated region 62 formed at the interface between the metal sheets 52 and 54 are of substantially the same size, the nuggets 64, 66 also are of substantially the same size.

During this time, the metal sheet 54 is pressed against the metal sheet 52 by the pressing rod 46. Since the metal sheet 54 is pressed in this manner, the metal sheet 54, which is of low rigidity, is prevented from warping due to electric current passing therethrough (heating thereof), i.e., the metal sheet 54 is prevented from becoming spaced from the metal sheet 52. Accordingly, the softened melted region is prevented from being scattered as sputter from a region where the metal sheets 54 and 52 might otherwise be spaced from each other.

After the nuggets 64, 66 grow sufficiently upon elapse of a predetermined time, supply of electric current is stopped, and the upper tip 38 is spaced away from the metal sheet 54. Alternatively, the upper tip 38 may be spaced away from the metal sheet 54 in order to electrically insulate the upper tip 38 from the lower tip 32.

The above operation sequence, from the start to the end of the resistance welding process, is performed entirely under the control of the gun controller 58.

When supply of electric current is stopped, heating of the metal sheets 50, 52, 54 also is completed. As time passes, the nuggets 64, 66 become cooled and solidified, thereby producing a joined product in which the metal sheets 50 and 52 are joined to each other, and the metal sheets 52 and 54 are joined to each other.

In the joined product, since, as described above, the nuggets 66 between the metal sheets 52 and 54 grow sufficiently due to a sufficient amount of Joule heat being generated at the interface between the metal sheets 52 and 54, the joint strength of the metal sheets 50 and 52 as well as the joint strength of the metal sheets 52 and 54 are excellent.

According to the first embodiment, as described above, the nugget 66, which is substantially the same in size as the nugget 64 formed between the metal sheets 50 and 52, can be grown between the metal sheets 52 and 54 while avoiding generation of sputter. Accordingly, a formed product in which the joint strength between the metal sheets 52 and 54 is excellent can be obtained.

According to the first embodiment, as the pressing force F2 applied by the pressing rod 46 increases, the nugget 66, which is formed between the metal sheets 52 and 54, also increases. However, the size of the nugget 66 tends to become saturated. In other words, even if the pressing force F2 is increased excessively, it is difficult for the nugget 66 to grow beyond a certain size. If the pressing force F2 is increased too much, then it is necessary to reduce the pressing force F1 excessively in order to keep the sum of the pressing forces F1 and F2 in equilibrium with the pressing force F3. As a result, the nugget 64 formed between the metal sheets 50 and 52 is liable to become small in size.

Therefore, it is preferable for the difference between the pressing force F1 applied by the upper tip 38 and the pressing force F2 applied by the pressing rod 46 to be set to a value by which the nuggets 64, 66 can be made as large as possible.

Figure 6:
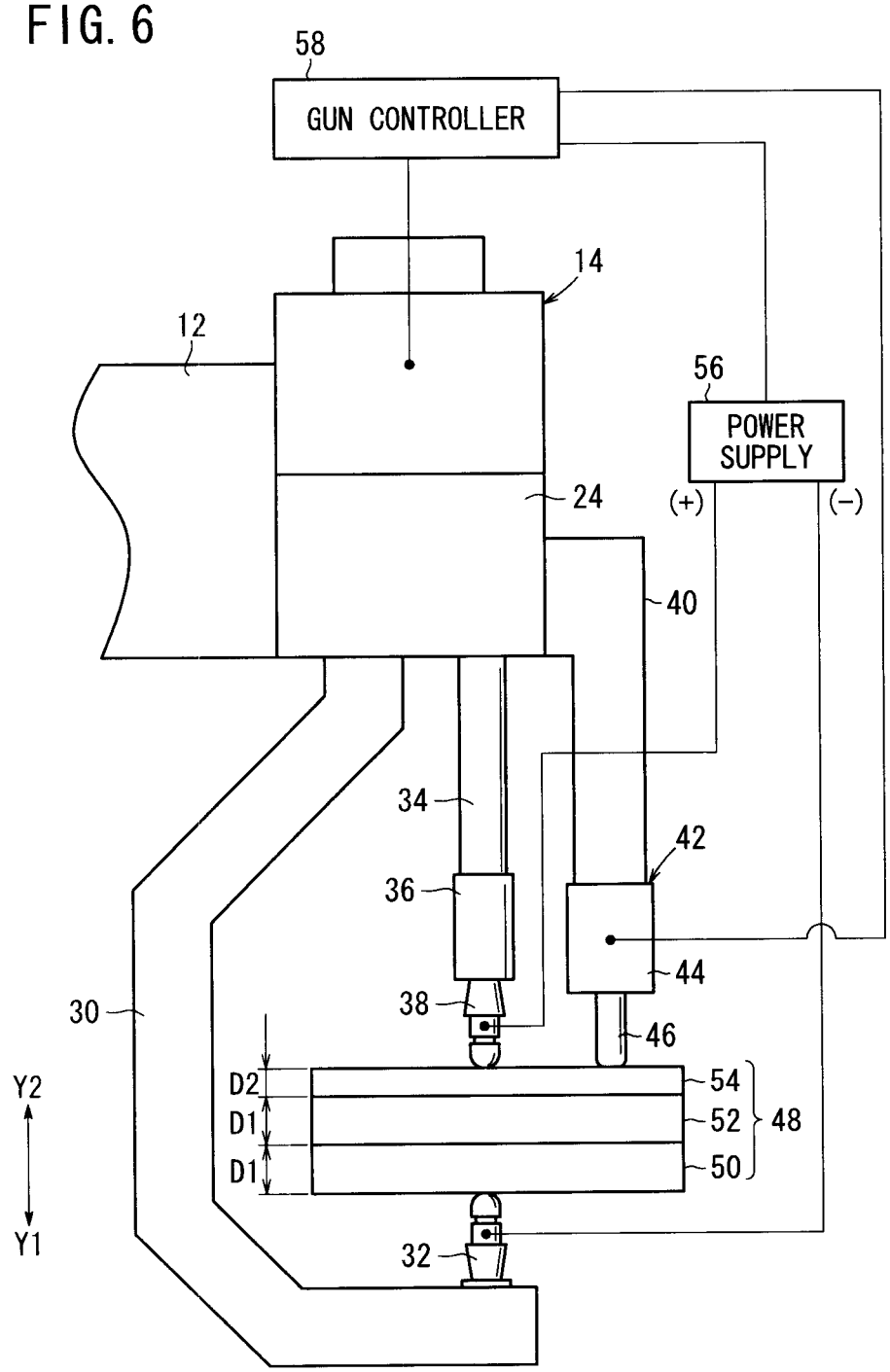
FIG. 6 is an enlarged view of a central portion of a resistance welding apparatus according to a modification of the first embodiment of the present invention.
Figure 7:
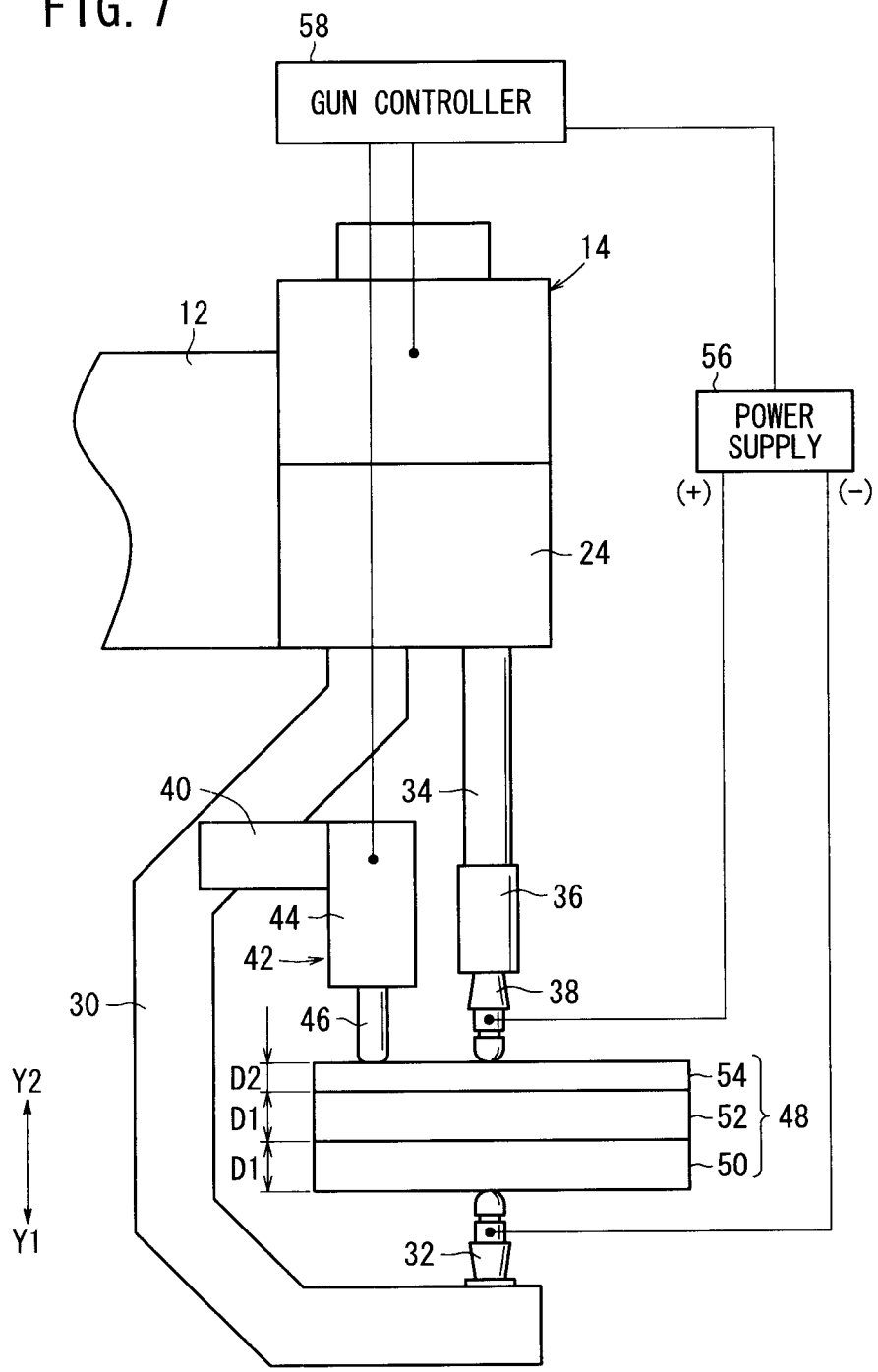
FIG. 7 is an enlarged view of a central portion of a resistance welding apparatus according to another modification of the first embodiment of the present invention.

With the resistance welding apparatus 10 shown in FIG. 1, the cylinder mechanism 42 is supported on the connecting rod 34. However, the cylinder mechanism 42 may be supported on the main gun body 24, as shown in FIG. 6, or may be supported on the fixed arm 30, as shown in FIG. 7.

At any rate, the cylinder mechanism 42 may be replaced by any of various pressure applying means, such as a spring coil, a servomotor, etc.

The pressing member may have annular shape surrounding the upper tip 38, or may be in the form of a plurality of round rods.

The pressing member may serve as an auxiliary electrode. A second embodiment of the present invention, which incorporates an auxiliary electrode, will be described below. Parts of the second embodiment, which are identical to those shown in FIGS. 1 through 7, are denoted by identical reference characters and such features will not be described in detail below.

Figure 8:
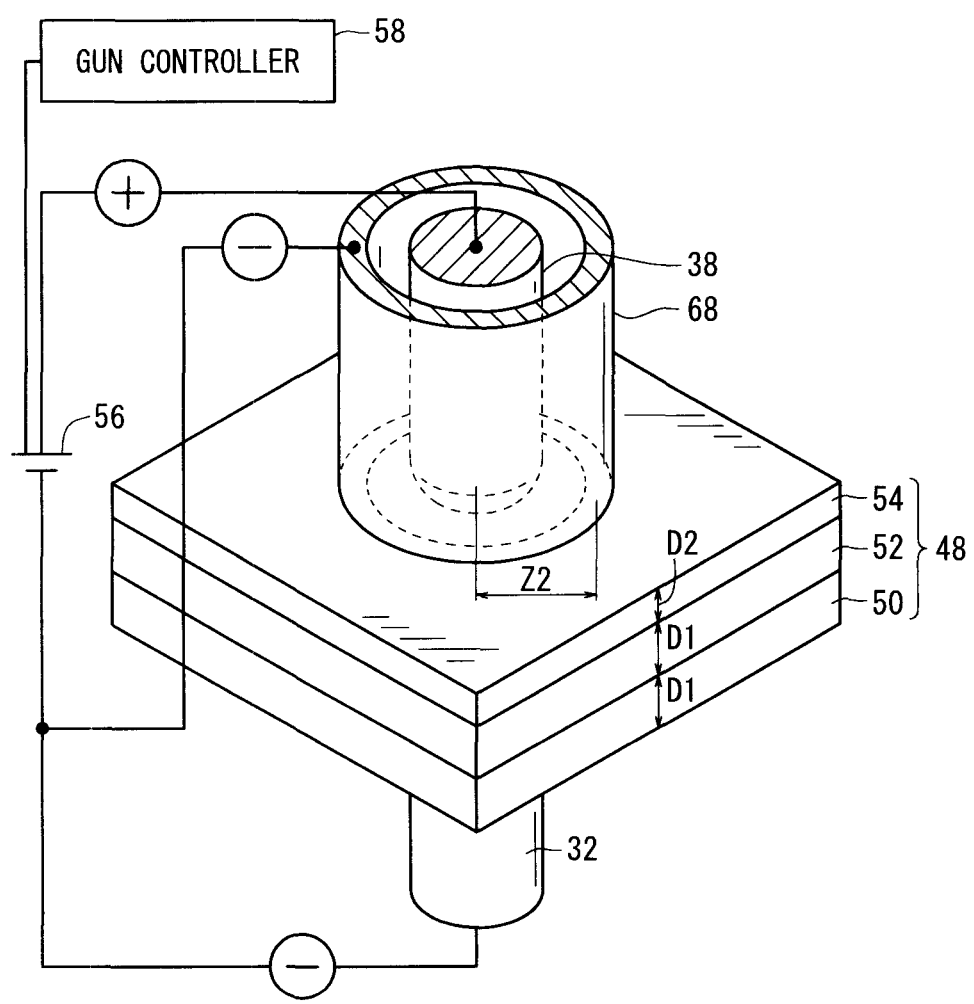
FIG. 8 is an enlarged perspective view, partially in transverse cross-section, showing a central portion of a resistance welding apparatus according to a second embodiment of the present invention.

FIG. 8 is an enlarged perspective view, partially in transverse cross-section, showing a central portion of a resistance welding apparatus according to a second embodiment of the present invention. Similar to the welding gun of the resistance welding apparatus according to the first embodiment, a welding gun (not shown) of the resistance welding apparatus according to the second embodiment is mounted on the wrist 12 of a non-illustrated robot, and includes a lower tip 32 (second welding electrode), an upper tip 38 (first welding electrode), and an annular auxiliary electrode 68 surrounding the upper tip 38. Also in the second embodiment, it is assumed that an electric current flows from the upper tip 38 toward the lower tip 32.

The upper tip 38 is supported on a main gun body 24, which includes a displacing mechanism for displacing the auxiliary electrode 68 toward or away from the stacked assembly 48, e.g., a ball screw mechanism, a cylinder mechanism, or the like. The displacing mechanism is capable of displacing the auxiliary electrode 68 toward or away from the stacked assembly 48 independently of the upper tip 38. In the second embodiment, the displacing mechanism is mounted on the welding gun.

According to the second embodiment, the upper tip 38 is electrically connected to a positive pole of the power supply 56, whereas the lower tip 32 and the auxiliary electrode 68 are electrically connected to a negative pole of the power supply 56. As can be understood from this fact, although both the upper tip 38 and the auxiliary electrode 68 are held against the metal sheet 54 of the stacked assembly 48, the upper tip 38 and the auxiliary electrode 68 are opposite in polarity to each other.

Similar to the first embodiment, in order to distribute pressing forces, the upper tip 38 and the auxiliary electrode 68 are spaced from each other by a distance Z2, which is set to a value such that an area (see FIG. 3) is developed where the surface pressure is lower than the surface pressure applied by the upper tip 38 and the surface pressure applied by the auxiliary electrode 68. The upper tip 38 and the auxiliary electrode 68 are spaced from each other by a certain distance. However, if the distance Z2 between the upper tip 38 and the auxiliary electrode 68 is too large, then the resistance between the upper tip 38 and the auxiliary electrode 68 becomes so large that it is difficult for a branched electric current i2 (see FIG. 2) to flow, as will be described later.

Therefore, the distance Z2 is set to a value that provides an appropriate surface pressure distribution between the thinnest workpiece 54 and the metal sheet 52, as well as for making the resistance between the upper tip 38 and the auxiliary electrode 68 of a value that allows a branched electric current i2 to flow at an appropriate current value.

The displacing mechanism and the power supply 56 are electrically connected to the gun controller 58.

A central portion of the resistance welding apparatus according to the second embodiment is basically constructed as described above. Operations and advantages of the resistance welding apparatus will be described below, in relation to a resistance welding method according to the second embodiment.

For resistance-welding the stacked assembly 48, the welding gun 14 is moved so as to position the stacked assembly 48 between the upper tip 38 and the lower tip 32, similar to the first embodiment. Thereafter, the upper tip 38 and the lower tip 32 are displaced relatively toward each other, thereby gripping the stacked assembly 48 therebetween.

Figure 9:
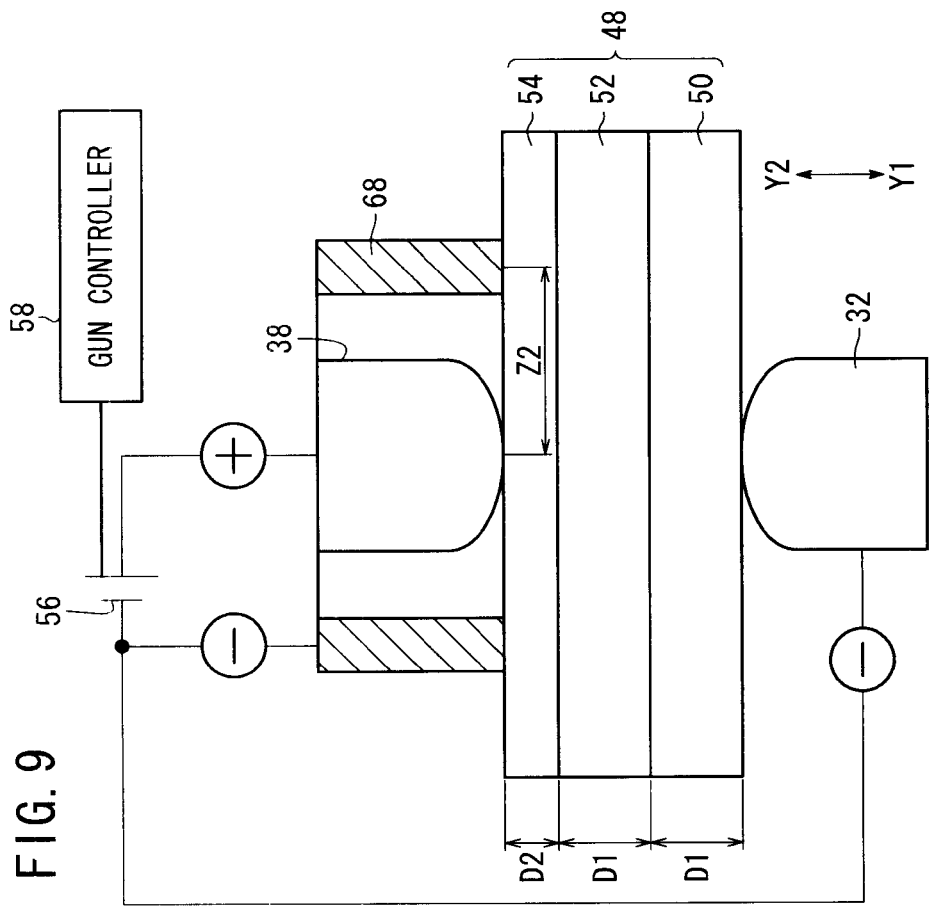
FIG. 9 is a vertical cross-sectional view showing the manner in which a stacked assembly is sandwiched by a first electrode tip, a second electrode tip, and an auxiliary electrode.

At the same time or almost at the same time that the stacked assembly 48 is gripped between the upper tip 38 and the lower tip 32, the auxiliary electrode 68 is held against the metal sheet 54, in the state shown in vertical cross section in FIG. 9. The auxiliary electrode 68 is displaced into abutment against the metal sheet 54 by the displacing mechanism, which displaces the auxiliary electrode 68.

The gun controller 58 sets the pressing force F2, which is applied from the auxiliary electrode 68 to the metal sheet 54, such that the sum (F1+F2) of the pressing force F2 and the pressing force F1, which is applied by the upper tip 38, is held in equilibrium with the pressing force F3, which is applied by the lower tip 32.

According to the second embodiment, as with the first embodiment, it is preferable to set the difference between the pressing force F1 applied by the upper tip 38 and the pressing force F2 applied by the auxiliary electrode 68 to a value at which the nugget formed between the metal sheets 52 and 54 can be made as large as possible.

Figure 10:
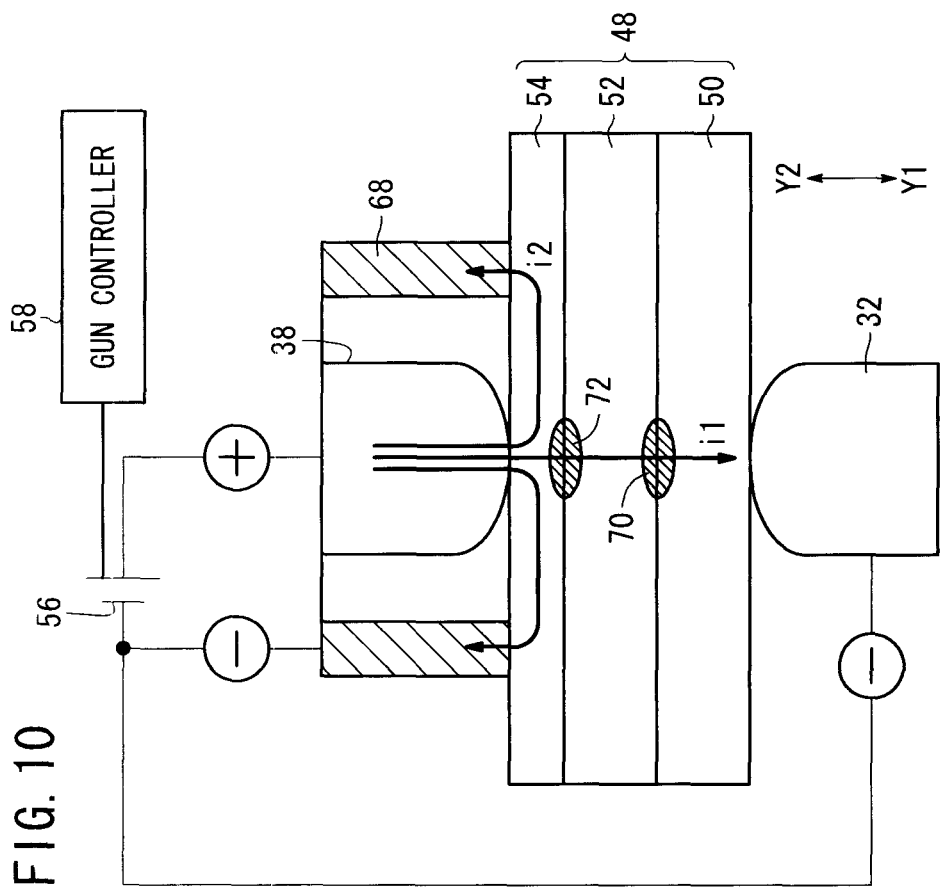
FIG. 10 is a vertical cross-sectional view showing the manner in which the resistance welding apparatus, from the state shown in FIG. 9, begins to pass an electric current, which flows from the upper tip toward the lower tip.

Then, supply of electric current is initiated. As shown in FIG. 10, an electric current i1 flows from the upper tip 38 toward the lower tip 32 because the upper tip 38 and the lower tip 32 are connected respectively to positive and negative poles of the power supply 56. The interface between the metal sheets 50 and 52 as well as the interface between the metal sheets 52 and 54 is heated by Joule heat, based on the electric current i1, thereby developing heated regions 70 and 72.

The auxiliary electrode 68 also is held against the metal sheet 54 and has a negative polarity. Simultaneously with the electric current i1, a branched electric current i2 begins to flow from the upper tip 38 toward the auxiliary electrode 68. Since the auxiliary electrode 68 has an annular shape, the branched electric current i2 flows radially.

According to the second embodiment, as described above, the branched electric current i2 is generated, which does not flow to the metal sheets 50 and 52, but flows only to the auxiliary electrode 68. As a result, the value of the electric current that passes through the metal sheet 54 is greater than in a conventional resistance welding process, which employs only the upper tip 38 and the lower tip 32.

Figure 11:
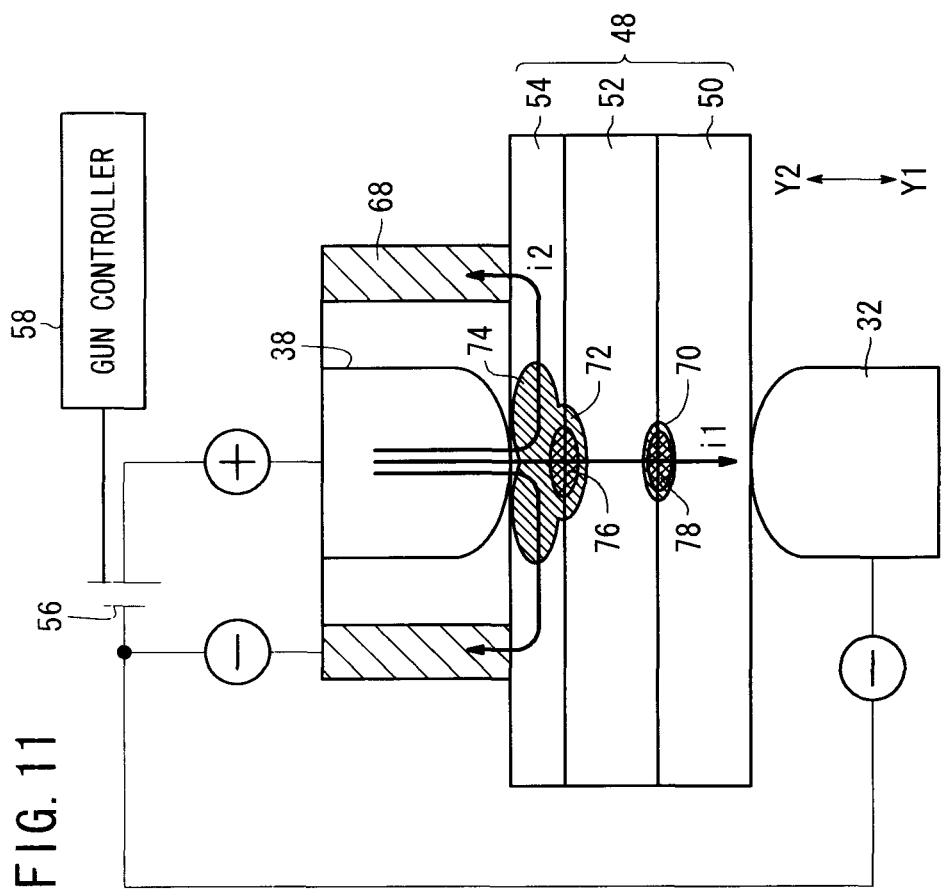
FIG. 11 is a vertical cross-sectional view showing the manner in which the resistance welding apparatus continues to pass electric current from the state shown in FIG. 10.

Consequently, separate from the heated region 72, another heated region 74 is developed in the metal sheet 54. As shown in FIG. 11, the heated region 74 heats the interface between the metal sheets 52 and 54 in a radial fashion. The heated region 74 spreads over time and combines integrally with the heated region 72.

Thus, heat is transferred from both heated regions 72 and 74, which are combined integrally with each other, to the interface between the metal sheets 52 and 54. Similar to the first embodiment, the contact resistance at the interface between the metal sheets 52 and 54 is greater than the contact resistance of the interface between the metal sheets 50 and 52. Therefore, the temperature of the interface between the metal sheets 52 and 54 increases sufficiently and begins to melt, thereby producing a nugget 76 between the metal sheets 52 and 54.

It is possible for the heated region 74 to be made larger in size, since the proportion of the branched electric current i2 is larger. However, if the proportion of the branched electric current i2 becomes too large, then since the value of the electric current i1 is reduced, the heated regions 70 and 72 are reduced in size. Therefore, the size of the nugget 76 tends to become saturated, and the nugget 78 tends to be reduced in size. Therefore, the proportion of the branched electric current i2 should preferably be set to a value such that the nugget 78 grows sufficiently.

As described above, the ratio between the electric current i1 and the branched electric current i2 can be adjusted, for example, by changing the distance Z2 (see FIGS. 8 and 9) between the upper tip 38 and the auxiliary electrode 68.

The nugget 76 grows over time as long as electric currents continue to be passed through the stacked assembly 48. Consequently, the nugget 76 can grow sufficiently by continuously passing electric currents over a predetermined time.

The value of the electric current i1 that flows through the metal sheets 50 and 52 is smaller than in a conventional resistance welding process. Accordingly, the amount of heat generated by the metal sheets 50 and 52 is prevented from increasing, while the nugget 76 between the metal sheets 52 and 54 grows to a larger size. Therefore, the possibility of sputtering is avoided.

During this time, the nugget 78 also is formed between the metal sheets 50 and 52 by the electric current i1. If the branched electric current i2 flows continuously, then since the total amount of current i1 that passes is smaller than if the branched electric current i2 were stopped, the heated region 70, and hence the nugget 78, tend to be slightly reduced in size.

Figure 12:
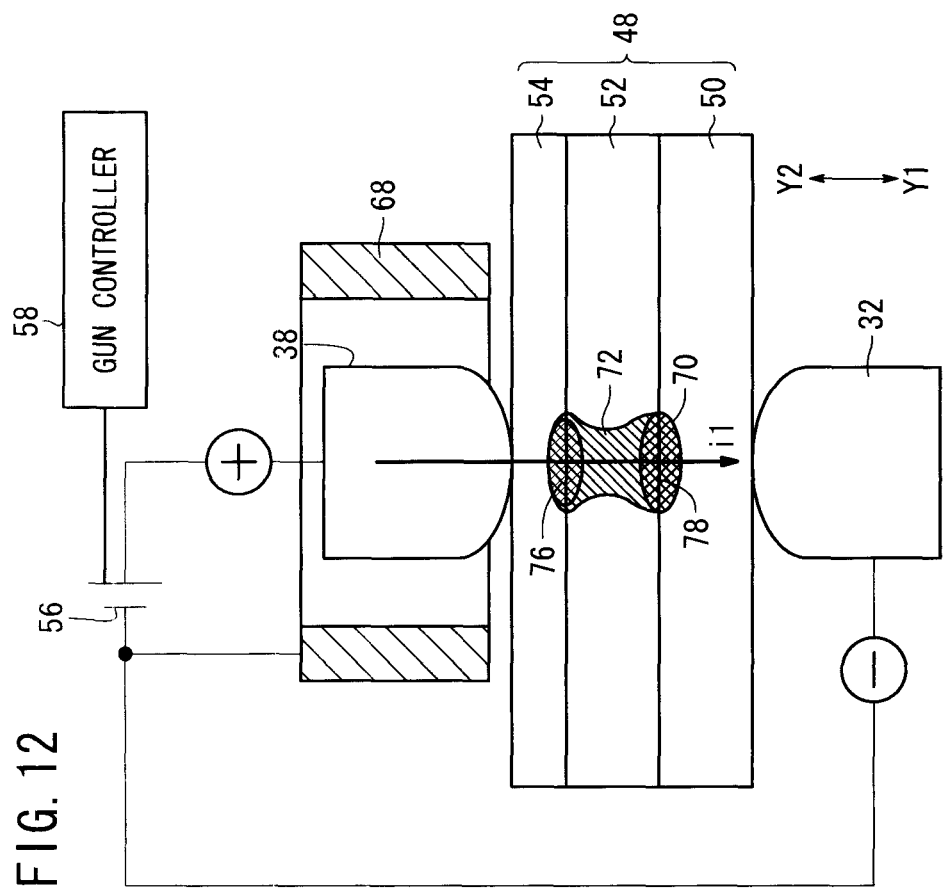
FIG. 12 is a vertical cross-sectional view showing the manner in which only the auxiliary electrode is lifted from the stacked assembly, and electric current is continuously passed so as to flow from the upper tip toward the lower tip.

Therefore, in order for the nugget 78 to grow further, it is preferable for only the auxiliary electrode 68 to be spaced from the metal sheet 54, and to continue passing electric current from the upper tip 38 toward the lower tip 32, as shown in FIG. 12. Since the value of the electric current i1 becomes greater as the auxiliary electrode 68 is further spaced from the thinnest workpiece 54, the total amount of electric current i1 increases until supply of the electric current is brought to an end.

In this case, inasmuch as the branched electric current i2 is eliminated, only the electric current i1, which is directed from the upper tip 38 toward the lower tip 32, flows through the metal sheet 54. As a result, the heated region 74 (see FIG. 11) disappears.

On the other hand, the metal sheets 50 and 52 are in the same state as in an ordinary resistance welding process. More specifically, the amount of generated Joule heat increases in the thicker metal sheets 50 and 52, with the result that the heated region 70 spreads and the temperature thereof becomes higher. The interface between the metal sheets 50 and 52 is heated by the heated region 70, the temperature of which becomes higher, whereas the region near the interface has a temperature that rises sufficiently and is melted, thereby accelerating growth of the nugget 78.

Figure 13:
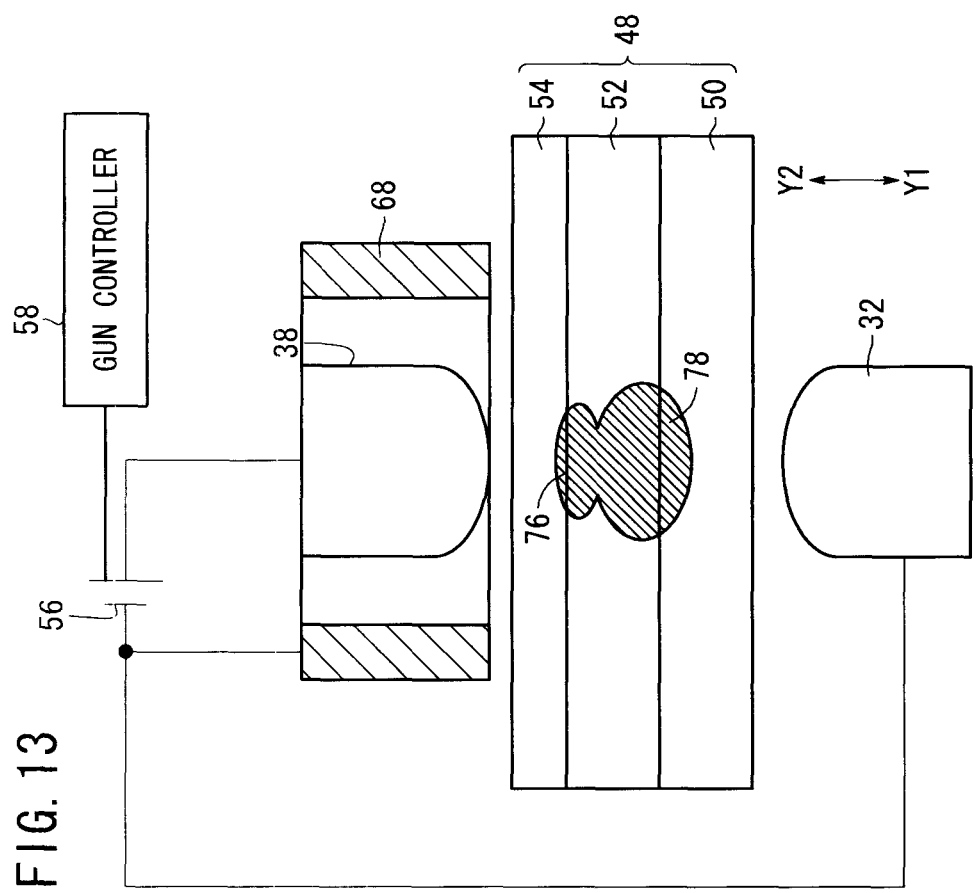
FIG. 13 is a vertical cross-sectional view showing the manner in which the upper tip also is lifted from the stacked assembly continuously from the state shown in FIG. 12, in order to finish the resistance welding process to pass the electric current.

Subsequently, the electric current flows continuously until the nugget 78 grows sufficiently, for example, until the nugget 78 becomes combined integrally with the nugget 76, as shown in FIG. 13. The rate at which the nugget 78 grows with respect to the time during which electric current flows continuously may be confirmed in advance in a resistance welding test, using test pieces or the like.

The interface between the metal sheets 50 and 52 is preheated by the heated region 70, which is developed by the electric current i1 that passes when the nugget 78 grows between the metal sheets 52 and 54. Therefore, the metal sheets 50 and 52 are fitted together adequately before the nugget 78 is grown, so that sputtering is less likely to be produced.

According to the second embodiment, as described above, sputtering is prevented from being produced as the nugget 76 grows between the metal sheets 52 and 54, and as the nugget 78 grows between the metal sheets 50 and 52.

After the nugget 78 has grown sufficiently upon elapse of a predetermined time, passage of electric current is stopped, and as shown in FIG. 13, the upper tip 38 is spaced away from the metal sheet 54. Alternatively, the upper tip 38 may be spaced away from the metal sheet 54 in order to electrically insulate the upper tip 38 from the lower tip 32.

The above operation sequence, from the start to the end of the resistance welding process, is performed entirely under the control of the gun controller 58.

When supply of electric current is stopped, heating of the metal sheets 50 and 52 also is completed. As time passes, the nugget 78 becomes cooled and solidified, thereby joining the metal sheets 50 and 52 to each other.

As described above, the metal sheets 50 and 52 are joined to each other, and the metal sheets 52 and 54 are joined to each other to thereby produce a joined product.

In the joined product, since, as described above, the nugget 76 between the metal sheets 52 and 54 is grown sufficiently due to the branched electric current i2 that flows through the metal sheet 54, the joint strength of the metal sheets 50 and 52 as well as the joint strength of the metal sheets 52 and 54 are excellent.

As can be understood from the above, the resistance welding apparatus according to the second embodiment may be constructed by providing the auxiliary electrode 68, and the displacing mechanism for displacing the auxiliary electrode 68. The structure of the resistance welding apparatus is not further complicated by providing the auxiliary electrode 68.

In the second embodiment, the auxiliary electrode 68 is spaced away from the metal sheet 54 before the upper tip 38 becomes spaced from the metal sheet 54. However, the auxiliary electrode 68 and the upper tip 38 may be spaced away from the metal sheet 54 simultaneously.

Figure 14:
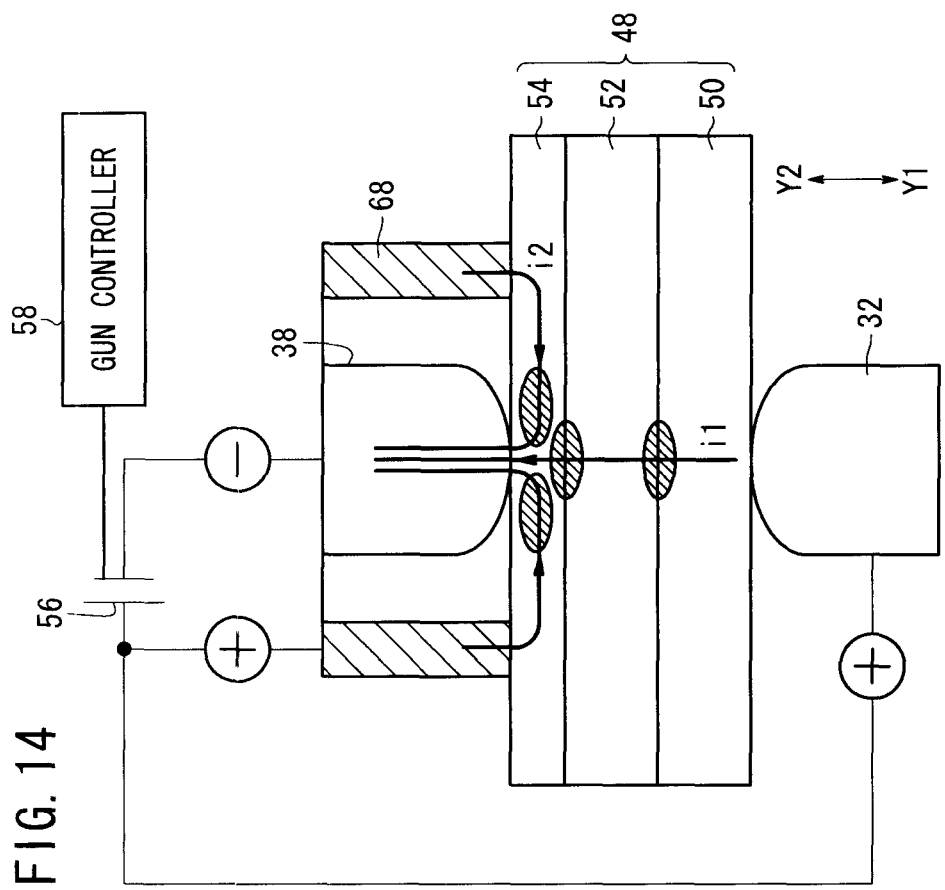
FIG. 14 is a vertical cross-sectional view showing the manner in which the resistance welding apparatus passes an electric current from the lower tip and a current branching electrode to the upper tip, conversely to the state shown FIG. 10.

Furthermore, as shown in FIG. 14, an electric current may be supplied and flow from the lower tip 32, which is held against the metal sheet 50, to the upper tip 38, which is held against the metal sheet 54. In this case as well, the auxiliary electrode 68, which is held against the metal sheet 54, is opposite in polarity to the upper tip 38. More specifically, the lower tip 32 and the auxiliary electrode 68 are electrically connected to the positive pole of the power supply 56, whereas the upper tip 38 is electrically connected to the negative pole of the power supply 56. Thus, an electric current i1 directed from the lower tip 32 toward the upper tip 38, and a branched electric current i2 directed from the auxiliary electrode 68 toward the upper tip 38 are produced.

Figure 15:
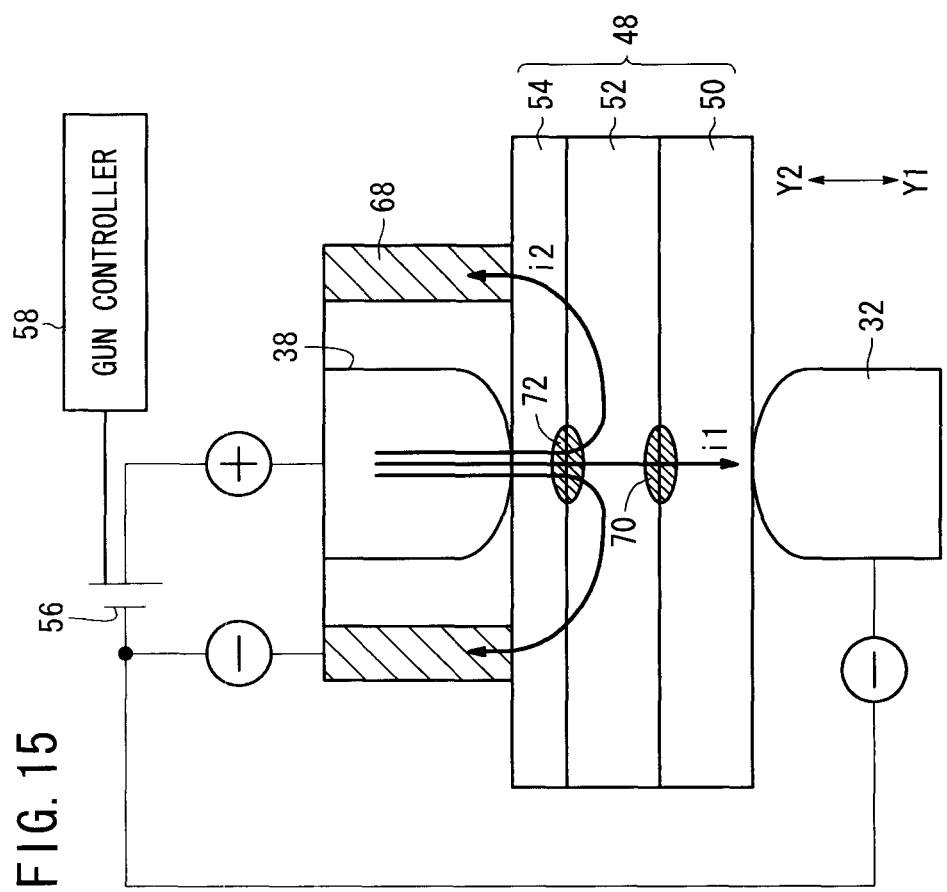
FIG. 15 is a vertical cross-sectional view showing the manner in which an electric current, which is directed from the first electrode tip toward the current branching electrode, flows to a workpiece, which is positioned on the uppermost side of the stacked assembly, and another workpiece positioned directly therebelow.

Moreover, as shown in FIG. 15, a branched electric current i2 may flow not only into the thinnest workpiece 54, which is held in contact with the upper tip 38, but also into the metal sheet 52, which is positioned directly below the thinnest workpiece 54.

Instead of spacing the auxiliary electrode 68 from the metal sheet 54, a switch may be connected between the auxiliary electrode 68 and the power supply 56. In this case, only an electric current directed from the upper tip 38 toward the auxiliary electrode 68, or only an electric current directed in the opposite direction may be stopped by turning off the switch. The switch may be connected or turned on in order to produce the heated region 74.

In this case, there is no need for a displacing mechanism for displacing the auxiliary electrode 68 separately away from the upper tip 38. Consequently, the structure of the apparatus and operational control for the apparatus are simplified.

At any rate, the auxiliary electrode 68 is not limited to the above annular shape. The auxiliary electrode 68 may be in the form of an elongate rod, similar to the upper tip 38 and the lower tip 32. In this case, the auxiliary electrode 68 may comprise a single electrode or a plurality of electrodes. If the auxiliary electrode 68 comprises a plurality of electrodes, then such electrodes may be brought simultaneously into or out of abutting engagement with the metal sheet 54.

The resistance welding apparatus according to the second embodiment may carry out the resistance welding method according to the first embodiment, assuming that the auxiliary electrode 68 and the power supply 56 are electrically insulated from each other. With the arrangement of the resistance welding apparatus according to the second embodiment, it is possible to select whether the resistance welding method according to the second embodiment or the resistance welding method according to the first embodiment is carried out, by selectively passing or not passing an electric current through the auxiliary electrode 68.

In the first embodiment and the second embodiment, a C-type welding gun has been illustrated. However, the welding gun may be a so-called X-type welding gun. More specifically, the lower tip 32 and the upper tip 38 may be mounted on a pair of respective chuck fingers, which are openable and closable, wherein the chuck fingers are opened or closed to move the lower tip 32 and the upper tip 38 away from or toward each other.

The stacked assembly may comprise four or more metal sheets.

The invention claimed is:

1. A resistance welding method for resistance-welding a stacked assembly of at least three metal workpieces, including a thinnest workpiece of the at least three workpieces, the thinnest workpiece having a thickness of 0.5 to 0.7 mm which is a minimum thickness of the at least three workpieces, and the thinnest workpiece is disposed on one outermost side of the stacked assembly, using a welding gun that is supported on a wrist of an arm of a robot and including a first welding electrode, a second welding electrode and a pressing mechanism, comprising the steps of:

holding the first welding electrode in abutment against the thinnest workpiece as a first outermost workpiece disposed on the one outermost side of the stacked assembly;

holding the second welding electrode in abutment against a second outermost workpiece disposed on another outermost side of the stacked assembly, on an area facing the first welding electrode;

holding a pressing member, the pressing member having an annular shape surrounding the first welding electrode, which is supported and operated independently of the first welding electrode by the pressing mechanism, in abutment against the first outermost workpiece only on an area that is apart from the first welding electrode and apart from a face-to-face position relative to the second welding electrode so that an interface between the thinnest workpiece and a workpiece adjacent thereto includes a first area where a first surface pressure is applied by the first welding electrode, a second area where a second surface pressure is applied by the pressing member and a third area between the first area and the second area, a third surface pressure at the third area being lower than each of the first and second surface pressures, and the first surface pressure being greater than the second surface pressure;

gripping the stacked assembly with the first welding electrode, the second welding electrode, and the pressing member, wherein the first welding electrode and the pressing member press the stacked assembly toward a side of the second welding electrode, and only the second welding electrode presses the stacked assembly toward a side of the first welding electrode with a pressing force in equilibrium with pressing forces applied from the first welding electrode and the pressing member; and passing an electric current between the first welding electrode and the second welding electrode.

2. The resistance welding method according to claim 1, wherein the pressing member comprises an auxiliary electrode, which is opposite in polarity to the first welding electrode, such that when the electric current is passed between the first welding electrode and the second welding electrode, either a branched electric current directed from the first welding electrode toward the auxiliary electrode, or a branched electric current directed from the auxiliary electrode toward the first welding electrode is produced.

* * * * *